United States Patent
Ito

(10) Patent No.: US 11,384,319 B2
(45) Date of Patent: Jul. 12, 2022

(54) CLEANER COMPOSITION, CLEANING AEROSOL, AND METHOD FOR CLEANING CONTAMINATED PART

(71) Applicant: THREEBOND CO., LTD., Tokyo (JP)

(72) Inventor: Hiroaki Ito, Tokyo (JP)

(73) Assignee: THREEBOND CO., LTD., Tokyo (JP)

(*) Notice: Subject to any disclaimer, the term of this patent is extended or adjusted under 35 U.S.C. 154(b) by 302 days.

(21) Appl. No.: 16/634,642

(22) PCT Filed: Aug. 3, 2018

(86) PCT No.: PCT/JP2018/029276
§ 371 (c)(1),
(2) Date: Jan. 28, 2020

(87) PCT Pub. No.: WO2019/031416
PCT Pub. Date: Feb. 14, 2019

(65) Prior Publication Data
US 2021/0087502 A1  Mar. 25, 2021

(30) Foreign Application Priority Data

Aug. 9, 2017 (JP) .............................. JP2017-153781

(51) Int. Cl.
| C09K 3/30 | (2006.01) |
| C11D 7/50 | (2006.01) |
| C11D 11/00 | (2006.01) |
| C11D 17/00 | (2006.01) |
| C23G 5/028 | (2006.01) |

(52) U.S. Cl.
CPC ........ *C11D 7/5018* (2013.01); *C11D 11/0041* (2013.01); *C11D 17/0043* (2013.01); *C23G 5/02825* (2013.01)

(58) Field of Classification Search
CPC .... C09K 3/30; C09K 5/044; C09K 2205/126; C09K 2205/122; C09K 2205/24; C09K 23/017
See application file for complete search history.

(56) References Cited

U.S. PATENT DOCUMENTS

| 2009/0305876 A1 | 12/2009 | Singh |
| 2011/0037016 A1 | 2/2011 | Singh |
| 2011/0041529 A1 | 2/2011 | Chen |
| 2012/0161063 A1 | 6/2012 | Singh |
| 2018/0250607 A1 | 9/2018 | Singh |

FOREIGN PATENT DOCUMENTS

| CN | 104045849 A | 9/2014 |
| EP | 3 556 837 A1 | 10/2019 |
| JP | H10-25496 A | 1/1998 |
| JP | H11-335697 A | 12/1999 |
| JP | 2008-120917 A | 5/2008 |
| JP | 2010-248443 A | 11/2010 |
| JP | 2011-510119 A | 3/2011 |
| JP | 2013-504658 A | 2/2013 |
| JP | 2013-506731 A | 2/2013 |
| JP | 2014-118441 A | 6/2014 |
| JP | 2016-29174 A | 3/2016 |
| JP | 6087465 B1 | 3/2017 |
| JP | 2017-110225 A | 6/2017 |
| WO | 2009/089511 A2 | 7/2009 |
| WO | 2009/140231 A2 | 11/2009 |

OTHER PUBLICATIONS

Chinese Office Action dated Jul. 5, 2021, in connection with corresponding CN Application No. 201880048875.5 (12 pp., including machine-generated English translation).
International Search Report and Written Opinion dated Sep. 11, 2018 in corresponding International Application No. PCT/JP2018/029276; 10 pages; Partial translation attached.
Extended European Search Report dated Apr. 8, 2021, in connection with corresponding EP Application No. 18843534.1; 12 pages.
Chinese Office Action dated Nov. 30, 2020, in connection with corresponding CN Application No. 201880048875.5 (14 pp., including partial machine-generated English translation).
Office Action dated Apr. 22, 2022 in Japan Patent Application No. 2019-535624 (with English translation); 6 pages.

*Primary Examiner* — John R Hardee
(74) *Attorney, Agent, or Firm* — Maier & Maier, PLLC

(57) ABSTRACT

A cleaner composition, a cleaning aerosol, and a method for cleaning a contaminated part, in which the contaminated part, particularly a part around an automobile brake or the like, can be cleaned easily, safely, and with high efficiency and minimal environmental impact. A cleaner composition can include a component (A); cis-1-chloro-3,3,3-trifluoropropene (HCFO-1233zdZ) as a cleaning agent; and a component (B); carbon dioxide as a propellant; wherein a content of the component (B) contains 1.6 to 10 parts by mass with respect to 100 parts by mass of the component (A).

8 Claims, No Drawings

CLEANER COMPOSITION, CLEANING AEROSOL, AND METHOD FOR CLEANING CONTAMINATED PART

FIELD

The present invention relates to a cleaning agent and relates to a cleaning agent which is suitable for cleaning machine parts, electrical and electronic equipment parts, optical equipment parts, and building materials, and particularly suitable for cleaning contamination caused by grease or the like on a surface of metal or resin of transportation equipment such as an automobile, train car, or the like.

BACKGROUND

Grease for the purpose of machining, mold release, lubrication or the like used during processing is attached to the surfaces of industrial machines, transports, electrical and electronic equipment, building materials, and the like. Further, grease for lubrication, cooling or the like is attached to each of drive portions and sliding portions of transports such as automobiles, trains, tractors, ships, airplanes, and forklifts. The contamination of the surface thereof progresses due to the scattering of the grease due to driving, attachment of contaminants present in the surrounding environment during driving, and the like. Particularly, a brake of an automobile or the like is significantly contaminated such that brake pads and brake shoes are worn by friction during braking, and the abrasion powder is attached to the circumference of the brake.

Such contamination needs to be removed. A cleaning aerosol including a hydrocarbon-based compound and a ketone compound as described in JP H10-25496 A as well as a cleaning aerosol including a hydrocarbon-based compound, an aliphatic alcohol, and the like as described in JP H11-335697 A are known as cleaning agents with excellent convenience. However, in these techniques, since the composition has high combustibility, the composition needs to be handled carefully. Further, there have been problems such as offensive odor and environmental impact.

In order to overcome such problems, there are proposed a cleaner composition including water, an alcohol-based compound, and a hydrocarbon-based compound as described in JP 2008-120917 A as well as a cleaner composition including water, an alcohol-based compound, and a cycloalkane compound as described in JP 2014-118441 A. However, sufficient detergency is not achieved by these techniques, and hydrocarbon-based compounds, alcohols, and the like are included, whereby there have still remained a few problems such as combustibility, offensive odor, and environmental impact.

For the purpose of solving the problems, WO 2009/140231 A (corresponding to US 2011/041,529 A) proposes a cleaner composition including a trans stereoisomer of 1-chloro-3,3,3-trifluoropropene (1,1,1-trifluoro-3-chloropropene, also indicated as "HCFO-1233zd") (the trans-stereoisomer is also indicated as "HCFO-1233zdE", "E-HCFO-1233zd" or the like). Further, J P 2013-504658 A, JP 2013-506731 A, JP 2011-510119 A, and related applications thereof disclose a composition including a trans or cis HCFO-1233zd (the cis form is also represented by "HCFO-1233zdZ", "Z-HCFO-1233zd" or the like), which is used for a blowing agent, a heat-transfer media, a solvent, aerosol or the like. On the other hand, JP 2010-248443 A and JP 6087465 B2 exemplify a composition for cleaning containing cis-HCFO-1233zd. Furthermore, J P 2016-29174 A and JP 2017-110225 A disclose an aerosol composition containing cis-HCFO-1233zd as a main agent and carbon dioxide as a propellant. The trans/cis-HCFO-1233zd described in these publications include characteristics such as excellent chemical stability, low toxicity, thermal conductivity, low flammability, and no flash point. In addition, the trans/cis-HCFO-1233zd has characteristics of having a negligibly small ozone depletion potential (ODP) expressed as a relative value in the case where CFC-11 (trichlorofluoromethane, $CCl_3F$) is 1.0, and a global warming potential (GWP) less than the standard value of carbon dioxide (GWP<1). In this way, since the trans/cis-HCFO-1233zd has an extremely low environmental impact, it has attracted attention in applications for refrigerants, blowing agents, cleaning agents, heat-conductive media, and the like, which are methods for use for release into the environment.

SUMMARY

However, HCFO-1233zdE described in WO 2009/140231 A (corresponding to US 2011/041,529 A) has a boiling point of about 19° C., so it is difficult to handle it as a liquid at a normal temperature. In the case where the HCFO-1233zdE is used as an aerosol, the HCFO-1233zdE is vaporized before reaching the coated portion, which causes a practical problem.

On the other hand, techniques described in JP 2013-504658 A, JP 2013-506731 A, and JP 2011-510119 A include a configuration including HCFO-1233zdE and HCFO-1233zdZ which has a boiling point of about 39° C. and is suitable for handling at a normal temperature. However, in the techniques described in these publications, a configuration including only of HCFO-1233zdE or a mixture of HCFO-1233zdE and Z is substantially considered, and each of the techniques is not a technique that focuses only on the characteristics of HCFO-1233zdZ. Further, the techniques described in these publications have not been sufficiently considered in relation to propellants to be combined when used as an aerosol.

Further, the techniques described in JP 2010-248443 A and JP 6087465 B2 are configuration including a cleaning agent using HCFO-1233zd identified as a cis isomer. However, the techniques described in these publications have not been sufficiently considered for characteristics when used as a cleaning aerosol, specifically, combinations with propellant components.

Further, the techniques described in JP 2016-29174 A and JP 2017-110225 A relate to an aerosol composition containing cis-HCFO-1233zd, carbon dioxide, and the like. However, in the techniques described in these publications, the aerosol including these combination has not been substantially assumed to be used as a cleaning agent, and the configuration when used as the cleaning agent has not been sufficiently considered.

In view of the above problems, the present inventor has studied the optimum combination for the cleaner composition used as an aerosol. As a result, the present inventor has solved the problems by the invention of the following configurations. That is, a first embodiment of the present invention is as follows.

A cleaner composition including:
a component (A); cis-1-chloro-3,3,3-trifluoropropene (HCFO-1233zdZ) as a cleaning agent; and
a component (B); carbon dioxide as a propellant;
where a content of the component (B) contains 1.6 to 10 parts by mass with respect to 100 parts by mass of the component (A).

The present invention also includes the following embodiments.

A second embodiment is a cleaning aerosol obtained by filling an aerosol container with the cleaner composition.

A third embodiment is the cleaning aerosol that is filled so that an internal pressure of the aerosol container is 0.4 to 0.7 MPa.

A fourth embodiment is the cleaning aerosol that does not substantially include a propellant other than carbon dioxide.

A fifth embodiment is a method for cleaning a contaminated part, including injecting the cleaning aerosol onto a contaminant attached to the contaminated part.

A sixth embodiment is the method for cleaning a contaminated part, where the contaminated part is an automobile part.

A seventh embodiment is the method for cleaning a contaminated part, where the automobile part is a brake part.

An eighth embodiment is the method for cleaning a contaminated part, where the contaminant includes an abrasion powder from a brake pad or brake shoe.

DETAILED DESCRIPTION OF EMBODIMENTS

A cleaner composition according to the present invention includes: a component (A); cis-1-chloro-3,3,3-trifluoropropene (HCFO-1233zdZ) as a cleaning agent; and a component (B); carbon dioxide as a propellant, where a content of the component (B) contains 1.6 to 10 parts by mass with respect to 100 parts by mass of the component (A). The cleaning aerosol of the present invention is obtained by filling an aerosol container with the cleaner composition. Further, the method for cleaning a contaminated part of the present invention includes injecting the cleaning aerosol onto a contaminant attached to the contaminated part. The cleaner composition, the cleaning aerosol, and the method for cleaning a contaminated part in the present invention are used, so that the contaminated part can be cleaned easily, safely, and with high efficiency and minimal environmental impact.

Details of the present invention will be described below.

The component (A) contained in the cleaner composition of the present invention is cis-1-chloro-3,3,3-trifluoropropene (HCFO-1233zdZ) as a cleaning agent, and is a main component that exerts a cleansing action of the cleaner composition of the present invention. As mentioned above, since the compound has a negligibly small ozone depletion potential (ODP) and a global warming potential (GWP) less than the standard value of carbon dioxide (GWP<1). Accordingly, even if the compound is used in a highly volatile cleaning agent, the environmental impact is infinitesimally small. Not only that, but the compound has a grease-dissolving power represented by a kauri-butanol (KB) value of 34, which is more than a KB value of 25 to 27 of the trans isomer (HCFO-1233zdE) and is a good standard compared to a general petroleum-based cleaning agent (KB value of a hydrocarbon mixture=about 25 to 35), whereby excellent cleaning performance is exerted. Accordingly, the compound is a component necessary for achieving both cleaning performance and low environmental impact performance, as a cleaning aerosol in order to remove contamination including grease, and the like. Note that, in the present invention, a known commercial product may be used as the compound. As the commercial product, for example, SOLVIA (manufactured by Central Glass Co., Ltd.) or the like is known.

Further, a boiling point (39° C.) of the compound (HCFO-1233zdZ) is different from a boiling point (about 19° C.) of HCFO-1233zdE, and the compound (HCFO-1233zdZ) can be handled safely even when the aerosol container is filled with the compound as the cleaning aerosol. Further, the compound does not volatilize immediately after injection, but volatilizes from the portion to be cleaned after washing away the dirt. Therefore, when the compound is used as a cleaning component of the cleaning aerosol, the compound is much more excellent than conventionally known substances from the viewpoint of cleaning properties and handling.

The component (B) contained in the cleaner composition of the present invention is carbon dioxide as a propellant component, and is a component that applies an injection pressure to contents of an aerosol container when the cleaner composition of the present invention is filled in the aerosol container and injected. Since the compatibility of carbon dioxide with the component (A) is in an appropriate range, a predetermined volume of carbon dioxide is present as a gas in the aerosol container. Thus, the pressure necessary to inject is added continuously to the component (A) present as a liquid. On the other hand, the part compatible with the component (A) can disperse the component (A) into a fine mist during aerosol injection, and can exhibit good physical properties as the cleaning aerosol when injected into the contaminated part. The preferable injection characteristics may be impaired by causing the cleaning aerosol of the present invention to includes a substance other than carbon dioxide as a propellant. Accordingly, the propellant component is particularly preferable not to substantially include the substance other than carbon dioxide.

The method for cleaning a contaminated part of the present invention includes injecting the cleaning aerosol obtained by filling an aerosol container with the cleaner composition of the present invention onto a contaminant attached to the contaminated part. Here, the contaminated part suitable to be cleaned in the present invention is an automobile part. Specifically, all kinds of dirt-attached automobile parts such as a drive system part, valve system part, brake system part, internal combustion system part, and electrical system part of an automobile, and the like are desirable. That is, the method for cleaning a contaminated part of the present invention can be widely applied for contaminants attached to contaminated parts such as an engine block, a cylinder head, a crankcase, a mission case, an injector, a manifold, a wheel, a suspension, a propeller shaft, and parts attached thereto. In the method for cleaning a contaminated part of the present invention, a particularly suitable contaminated part to which the contaminant to be cleaned is attached is a brake part, specifically, a brake caliper, a brake drum, various parts associated therewith or the like. Preferably, the contaminant attached to the brake part includes an abrasion powder from a brake pad or brake shoe. Grease derived from a sliding portion of an automobile or the surrounding environment such as a road surface, together with the abrasion powder finely scattered, is attached to the circumference of the brake part, whereby both the physical cleaning effect resulting from the injection pressure of aerosol and the cleaning effect resulting from the solubility of the cleaning agent are required. Therefore, in order to clean the circumference of the brake part with the cleaning aerosol, it is necessary to inject the aerosol with a certain momentum into a wide area to some extent. Thus, the component (B) is a particularly important element in order to impart desired injection characteristics to the cleaning aerosol of the present invention.

The content of the component (B) is in a range of 1.6 to 10 parts by mass with respect to 100 parts by mass of the component (A). The content is more preferably in a range of 1.7 to 8.0 parts by mass, still more preferably in a range of 1.7 to 7.5 parts by mass, and particularly preferably in a range of 1.7 to 6.0 parts by mass. The content of the component (B) with respect to the component (A) is in the range, so that the component (B) and the component (A) in the aerosol container are compatible to an appropriate extent and the cleaning aerosol of the present invention can be discharged at an appropriate injection pressure during injection.

Here, it is assumed that the cleaner composition of the present invention is filled in an aerosol container as mentioned above and used as the cleaning aerosol. That is, the cleaning aerosol of the present invention is obtained by filling the aerosol container with the cleaner composition. Here, as the characteristics of the cleaning aerosol, the internal pressure of the aerosol container when filled with the cleaner composition containing the component (A) and the component (B) is preferably in a range of 0.4 to 0.7 MPa, and particularly preferably in a range of 0.45 to 0.65 MPa. When the internal pressure of the aerosol container is within the range, the cleaning aerosol of the present invention can be injected at an appropriate injection pressure. As a result, a physical cleaning effect on the contaminated part can be exerted. When the internal pressure is less than the range, the cleaning aerosol of the present invention may have an insufficient physical cleaning effect. When the internal pressure exceeds the range, the amount of injection per hour becomes too large, and thus a harmful effect of accelerating consumption may be caused. Here, as a standard for realizing the internal pressure of the aerosol container in the above range, for example, 0.48 MPa of the internal pressure is in the case where a 180 $cm^3$-aerosol container is filled with 97 g and 3 g of the component (A) and the component (B), respectively. 0.55 MPa of the internal pressure as the standard is in the case where the aerosol container is filled with 95.3 g and 4.7 g of the component (A) and the component (B), respectively. 0.6 MPa of the internal pressure as the standard is in the case where the aerosol container is filled with 94.5 g and 5.5 g of the component (A) and the component (B), respectively. Therefore, the internal pressure of the aerosol container can be set by adjusting the filling amounts of the component (A) and the component (B). As a point to be noted at the time of the adjustment, in the case where the filling amount of the component (A) with respect to the capacity of the aerosol container is small, a desirable injection pressure can be secured by increasing the filling ratio of the component (B). Note that a conventionally well-known method can be employed as the method for filling the aerosol container with the cleaner composition. For example, the aerosol container can be filled with the cleaner composition using a method in which a pressure-resistant container made of tin or aluminum is previously filled with the component (A), sealed with a lid having a valve, and then the compressed carbon dioxide (the component (B)) gas is injected through the valve, and the like.

In the present invention, optional components other than the components (A) and (B) can be added as appropriate, within a range that does not impair the characteristics. Examples of the component include surfactants such as a sorbitan fatty acid ester compound and a polyoxyethylene compounds; ultraviolet absorbers such as a benzophenone compound, a benzotriazole compound, a hindered amine compound; antioxidants such as a phenol compound and an amine compound; chelating agents such as an ethylenediaminetetraacetic acid compound; rust inhibitors such as an alkylamine compound; and the like. Any material can be appropriately selected as long as the material is uniformly dissolved and dispersed in the component (A). Note that, as mentioned above, the propellant components may affect the injection characteristics due to the compatibility with the component (A), and thus substances other than the component (B) are not substantially included in the present invention.

EXAMPLES

Hereinafter, the effects of the present invention will be described in detail by way of examples. However, these examples are not intended to limit the embodiments of the present invention.

The characteristics of the components of the cleaning agent used in the cleaner composition of the present invention (hereinafter also simply referred to as "cleaning agent") and the cleaning aerosol obtained by filling the aerosol container with the cleaner composition were evaluated in Examples, Comparative Examples, and Reference Examples according to the following method. Further, each of the cleaning aerosols evaluated in the Examples, the Comparative Examples, and the Reference Examples was prepared by filling a 180 $cm^3$-test aerosol container under pressure in a 25° C. environment with raw materials shown Table 2 having respective masses (g) described in Table 2, sealing the container, lightly shaking the container to stir the raw materials, and attaching an injection button with the container.

[Evaluation of Grease Cleaning Properties]

0.5 g of each grease shown in Table 1 was sealed in a vial container, 50 $cm^3$ of each cleaning agent was poured into the vial container, and the mixture was stirred with a glass rod and allowed to stand for 30 seconds. After that, the evaluation was performed by visually observing the solubility of each grease in the liquid. The results are shown in Table 1.

<Evaluation Criteria for Grease Cleaning Properties>

One in which grease was completely compatible with the cleaning agent and no separation or settling occurred was judged as excellent and indicated by ⊙.

One in which grease was not completely compatible, no separation or settling occurred, and the liquid was suspended or emulsified was judged to be acceptable (though did not reach an excellent level) and indicated by ○.

One in which grease was separated or settled was judged to be unacceptable and indicated by X.

Note that each grease used in the evaluation is described below.

Engine oil: Castrol (registered trademark) engine oil OW-20 SN grade, manufactured by BP Japan KK Gear oil: Castrol (registered trademark) gear oil 75W-90, manufactured by BP Japan KK Brake fluid: Castrol (registered trademark) brake fluid, manufactured by BP Japan KK

[Evaluation of Brake Cleaning Properties]

A lining portion of a commercially available brake shoe (NBK for brake shoe rear, product number; T0042-30, manufactured by Nisshinbo Holdings Inc.) was ground with a medium-mesh file to prepare an abrasion powder. 1 g of grease (Nigroove RM, manufactured by Nippon Grease Co., Ltd.) was dropped into 0.5 g of the abrasion powder, and kneaded thoroughly to prepare an abrasion powder sample to which the oil content was attached. 1 g of the sample was thinly stretched over an area of 10 cm² of a smooth stainless plate to obtain a test piece. On the other hand, in a 25° C. environment, a 180 cm³ test aerosol container was filled with 100 g of each of the cleaning agents described in Table 1 and carbon dioxide, and the filling amount of the carbon dioxide was adjusted so that the internal pressure of the aerosol container was adjusted to 0.55 MPa using a pressure gauge, thereby preparing a test aerosol. The evaluation was performed such that the test piece was placed in a vertical direction, the test aerosol was injected onto the sample-attached portion of the test piece from a distance of 30 cm in a perpendicular direction to the sample-attached portion for 10 seconds, and the sample-attached state was visually observed. The results are shown in Table 1.

<Evaluation Criteria for Brake Cleaning Properties>

One in which any remaining sample was not visually observed was judged to be acceptable and indicated by ◯.

One in which any remaining sample was observed was judged to be unacceptable and indicated by X.

[Confirmation of Injection Pressure]

A pressure gauge (product number AU100, manufactured by Ebara Keiki Seisakusho KK) was inserted into an actuator portion of each test aerosol obtained by filling the aerosol container with a predetermined mass of the cleaning agent (A) (SOLVIA) and each propellant in Table 2, and the pressure in an initial state of the aerosol container (i.e., injection pressure) was measured. Each of the aerosols was adjusted so that the total amount of the cleaning agent and the propellant was 100 g. In Comparative Examples 1, 2, and 4, the aerosol container was filled with the cleaning agent (A) and each of the propellants so as to have the composition in which the mass ratio of the cleaning agent (A) and the propellant was 2:1. In Comparative Example 3, the propellant was completely incompatible with the cleaning agent (A), and the internal pressure was increased by a small amount of filling. Thus, the aerosol container was filled with the propellant only in the mass for providing an appropriate injection pressure. In Reference Examples 1 to 4, in addition to a predetermined amount of carbon dioxide as the propellant, a propellant having high compatibility with the cleaning agent (A) was further added, and the mass ratio of the components was varied, and the aerosol container was filled with the components. In Comparative Example 5 and Examples 1 to 3, the mass ratio of the cleaning agent (A) and carbon dioxide as the propellant was varied, and the aerosol container was filled with these components. The measurement results are recorded as pressure values (MPa), and the results are shown in Table 2 as injection pressures (MPa).

<Evaluation Criteria for Injection Pressure>

As a standard of the injection pressure for exerting an appropriate physical cleaning effect in the cleaning aerosol, the value is 0.4 MPa or more. Therefore, when the injection pressure shown in Table 2 was 0.4 MPa or more, it was judged to be acceptable. When the injection pressure shown in Table 2 was less than 0.4 MPa, it was judged to be unacceptable.

[Evaluation of Injection Pattern]

Each test aerosol with an injection button attached, which was obtained by filling an aerosol container with a predetermined mass of the cleaning agent (SOLVIA (registered trademark)) and a predetermined mass of each of the propellants shown in Table 2 was injected toward a flat plate at a distance of 30 cm, and the injection pattern at that time was observed visually. The results are shown in Table 2.

<Evaluation Criteria for Injection Pattern>

One in which mist was widely diffused and sprayed on a flat plate was judged to be acceptable, and indicated as "A".

One in which mist was not diffused and was discharged in a straight line was judged to be unacceptable and indicated as "B".

[Cleaning Agent Raw Materials for Evaluation]

The component (A) and components to be compared with the component (A) (cleaning agents for evaluation shown in Table 1 and the component (A) shown in Table 2)

(Component (A)) SOLVIA (registered trademark): cis-1-chloro-3,3,3-trifluoropropene, manufactured by SOLVEX INC.

(Comparison) SOLVE55 (registered trademark): a mixture of 1,1,1,3,3-pentafluorobutane, dimethyl carbonate, and isooctane, manufactured by SOLVEX INC.

(Comparison) SOLVEC-3D: a mixture of hydrofluoroether and trans-1,2-dichloroethylene, manufactured by SOLVEX INC.

(Comparison) ZEORORA (registered trademark) H: 1,1,2,2,3,3,4-pentafluorocyclopentane, manufactured by ZEON CORPORATION (Comparison) Mixture of ASAHIKLIN (registered trademark) AK-225: 3,3-dichloro-1,1,1,2,2-pentafluoropropane and 1,3-dichloro-1,1,2,2,3-pentafluoropropane, manufactured by ASAHI GLASS CO., LTD.

(Comparison) ASAHIKLIN (registered trademark) AE-3000: 1,1,2,2-tetrafluoroethyl-2,2,2-trifluoroethyl ether, manufactured by ASAHI GLASS CO., LTD.

(Comparison) Novec7100: a mixture of methyl nonafluorobutyl ether and methyl nonafluoroisobutyl ether, manufactured by 3M Japan Limited (Comparison) Novec7200: a mixture of ethyl nonafluorobutyl ether and ethyl nonafluoroisobutyl ether, manufactured by 3M Japan Limited (Comparison) Vertrel (registered trademark)-XF: 1,1,1,2,2,3,4,5,5,5-decafluoropentane (HFC-43-10mee), manufactured by Du Pont-Mitsui Fluorochemicals Co., Ltd.

Note that all the "GWP (global warming potential)", "ODP (ozone depletion potential)", "flash point", "flammability", "KB (kauri-butanol) value", and "boiling point (° C.)" described in Table 1 are characteristic values of the substances or mixtures, and are not evaluation results of the present invention.

[Propellant Raw Materials]

The component (B) and components to be compared with the component (B) (the component (B) and components (B') to be compared with the component (B) shown in Table 2)

(Component (B)) carbon dioxide: manufactured by Tokyo Koatsu Co., Ltd.

(Comparison) liquefied petroleum gas (LPG): manufactured by Sanai Obbligas Higashinihon K.K., Ltd.

(Comparison) dimethyl ether (DME): manufactured by Koike Chemical Co., Ltd.

(Comparison) nitrogen gas: manufactured by Tokyo Koatsu Co., Ltd.

(Comparison) 1,3,3,3-tetrafluoropropene (HFO-1234ze): trade name: Solstice (registered trademark), manufactured by Honeywell Japan Ltd.

TABLE 1

| Cleaning agents for evaluation | GWP | ODP | Flash point | Flammability | KB value | Boiling point (° C.) | Grease cleaning properties Engine oil | Gear oil | Brake fluid | Brake cleaning properties |
|---|---|---|---|---|---|---|---|---|---|---|
| SOLVIA | <1 | 0 | No | No | 34 | 39 | ⊙ | ⊙ | ⊙ | ○ |
| SOLVE55-DH | 890 | 0 | No | Yes | 13 | 40 | ○ | ⊙ | ⊙ | ○ |
| SOLVEC-3D | 60 | 0 | No | Yes | 52 | 43 | ⊙ | ⊙ | ⊙ | ○ |
| ZEORORA H | 195 | 0 | No | No | 14 | 83 | ○ | ○ | ⊙ | X |
| AK-225 | 370 | 0.03 | No | No | 31 | 54 | ○ | ⊙ | ⊙ | ○ |
| AE-3000 | 870 | 0 | No | No | 13 | 56 | ○ | ○ | ⊙ | ○ |
| Novec 7100 | 320 | 0 | No | No | 10 | 61 | X | X | ○ | X |
| Novec 7200 | 59 | 0 | No | No | 10 | 78 | X | X | ○ | X |
| Vertrel-XF | 1300 | 0 | No | No | 10 | 55 | X | X | ○ | X |

As shown in Table 1, it is found that SOLVIA (registered trademark): cis-1-chloro-3,3,3-trifluoropropene itself, i.e., the component (A), has characteristics of having a very low GWP compared with the components to be compared with the component (A), and simultaneously having no flammability. Further, since SOLVIA has the characteristics, the boiling point is a value that is not too high. Thus, SOLVIA as the cleaning aerosol is sprayed onto the contaminated part, and then the liquid agent volatilizes rapidly without remaining in the part for a long time. Furthermore, the KB value, which is an index of grease-dissolving power, is also a relatively good value, and thus SOLVIA has suitable characteristics for removing any dirt of grease.

Further, it was confirmed that it was possible to cause the component (A) of the present invention to be sufficiently dissolved in all of engine oil, gear oil, and brake fluid, and the component (A) had excellent grease cleaning properties. Furthermore, it was confirmed that the brake cleaning properties was also sufficient performance. In addition to the component (A), only SOLVEC-3D showed the same performance as the component (A) in grease cleaning properties and brake cleaning properties. However, since SOLVEC-3D has a GWP more than SOLVIA (registered trademark) as the component (A) and also has flammability, it is not suitable for the cleaning aerosol.

TABLE 2

| | | Comparative Example 1 | Comparative Example 2 | Comparative Example 3 | Comparative Example 4 | Reference Example 1 | Reference Example 2 | Reference Example 3 |
|---|---|---|---|---|---|---|---|---|
| (A) | SOLVIA | 66.7 | 66.7 | 95.3 | 66.7 | 67.7 | 77.7 | 87.7 |
| (B') | LPG | 33.3 | | | | | | |
| | DME | | 33.3 | | | | | |
| | Nitrogen gas | | | | 4.7 | | | |
| | HFO-1234ze | | | | | 33.3 | 20 | 10 |
| (B) | Carbon dioxide | | | | | 2.3 | 2.3 | 2.3 |
| | Total | 100 | 100 | 100 | 100 | 100 | 100 | 100 |
| * Mass of carbon dioxide with respect to 100 wt of (A) | | — | — | — | — | 3.40 | 2.96 | 2.62 |
| Aerosol characteristics | Injection pressure (MPa) | 0.35 | 0.35 | 0.53 | 0.18 | 0.48 | 0.48 | 0.5 |
| | Injection pattern | A | A | B | A | A | A | A |

| | | Reference Example 4 | Comparative Example 5 | Comparative Example 6 | Example 1 | Example 2 | Example 3 | Example 4 |
|---|---|---|---|---|---|---|---|---|
| (A) | SOLVIA | 92.7 | 98.5 | 90.5 | 97.0 | 95.3 | 94.5 | 98.3 |
| (B') | LPG | | | | | | | |
| | DME | | | | | | | |
| | Nitrogen gas | | | | | | | |
| | HFO-1234ze | 5 | | | | | | |
| (B) | Carbon dioxide | 2.3 | 1.5 | 9.50 | 3.0 | 4.7 | 5.5 | 1.7 |
| | Total | 100 | 100 | 100.0 | 100 | 100 | 100 | 100 |
| * Mass of carbon dioxide with respect to 100 wt of (A) | | 2.48 | 1.52 | 10.5 | 3.09 | 4.93 | 5.8 | 1.7 |
| Aerosol characteristics | Injection pressure (MPa) | 0.52 | 0.24 | — | 0.48 | 0.55 | 0.6 | 0.4 |
| | Injection pattern | A | B | — | A | A | A | A |

Note:
The mark "—" in the row of the injection pressure and the mark "—" in the row of the injection pattern in the column of Comparative Example 6 in Table 2 indicate that the injection pressure was too high, whereby it was impossible to fill a can with carbon dioxide due to the possibility of rupture of the can and it was impossible to measure the injection pressure and the injection pattern.

As shown in Table 2, it was confirmed that, as the propellant to be combined with SOLVIA (registered trademark) (cis-1-chloro-3,3,3-trifluoropropene), i.e., the component (A), it was necessary to use carbon dioxide, i.e., the component (B), in the mass ratio within the range specified in the present invention. On the other hand, the injection pattern was good in Comparative Example 1. However, the LPG as the propellant is a flammable gas, and is not appropriate as the cleaning aerosol because it is not possible to solve the problem of non-flammability which is the object of the present invention. Although the injection pattern of Comparative Example 2 is also good, the DME as the propellant is also combustible and has low compatibility with the component (A). Thus, the injection pressure gradually decreases as the aerosol injection continues, and it can be confirmed that the physical cleaning effect tends to reduce. This is not suitable for the cleaning aerosol. In Comparative Example 3 using nitrogen gas as the propellant, the injection pattern is unsatisfactory, which is not suitable for the cleaning aerosol. In Comparative Example 4, the injection pattern was good. However, the compatibility of the HFO-1234ze as the propellant with the component (A) is too high, and thus the injection pressure at the time of aerosol injection does not increase and a sufficient physical cleaning effect cannot be exerted, which is not suitable for the cleaning aerosol. In Reference Examples 1 to 3, the injection pattern was good and the injection pressure was good. However, it was confirmed that the injected portion was supercooled, causing condensation or freezing. This is thought to be because carbon dioxide is included in two types of propellants, whereby the injected mist particles are fined when aerosol is injected, the volatilization of HFO-1234ze as a propellant having a low boiling point (−19° C.) propellant is promoted, and the heat of vaporization is taken away from the surroundings. Therefore, in the composition of the Reference Example, it is suggested that rust may occur depending on the base material due to condensation or freezing, and further a harmful effect of hindering of cleaning or the like may occur. In Reference Example 4, condensation and freezing did not occur, and the injection pressure was good, but mist particles were too fined. It is necessary to perform injection from a site very close to the contaminated part in order to exert the physical cleaning effect. Thus, there is some difficulty in workability. In Comparative Example 5, both the injection pressure and the injection pattern are unsatisfactory, which is not suitable for the cleaning aerosol. In Comparative Example 6, the injection pressure is too high, which is thus not suitable for the cleaning aerosol. When the injection pressure is too high, the pressure of the cleaning liquid that hits a member is too strong, and there is a risk of damaging the member or rupturing a can.

INDUSTRIAL APPLICABILITY

The cleaner composition, the cleaning aerosol, and the method for cleaning a contaminated part in the present invention are useful such that a contaminated part of industrial machine parts, transport equipment parts, electrical and electronic parts, civil engineering, construction, structural materials, and the like, particularly a contaminated site to which a grease content and a solidified product are attached, in the surrounding area of an automobile brake or the like, can be cleaned easily, safely, and with high efficiency and minimal environmental impact.

This application is based on JP 2017-153781 A filed on Aug. 9, 2017, the disclosure of which is incorporated by reference in its entirety.

The invention claimed is:

1. A cleaning aerosol obtained by filling an aerosol container with a cleaner composition,
    wherein the cleaner composition consists of:
    a component (A); cis-1-chloro-3,3,3-trifluoropropene (HCFO-1233zdZ) as a cleaning agent; and
    a component (B); carbon dioxide as a propellant,
    wherein a content of the component (B) contains 1.6 to 10 parts by mass with respect to 100 parts by mass of the component (A), and
    wherein the aerosol container is filled so that an internal pressure of the aerosol container in a 25° C. environment is 0.4 to 0.7 MPa.

2. The cleaning aerosol according to claim 1, wherein the aerosol container is filled so that an internal pressure of the aerosol container in the 25° C. environment is 0.45 to 0.65 MPa.

3. The cleaning aerosol according to claim 1, wherein the content of component (B) contains 1.7 to 8.0 parts by mass with respect to 100 parts by mass of the component (A).

4. A method for cleaning a contaminated part, comprising:
    injecting a cleaning aerosol obtained by filling an aerosol container with a cleaner composition, consisting of:
    a component (A); cis-1-chloro-3,3,3-trifluoropropene (HCFO-1233zdZ) as a cleaning agent; and
    a component (B); carbon dioxide as a propellant,
    wherein a content of the component (B) contains 1.6 to 10 parts by mass with respect to 100 parts by mass of the component (A), and
    wherein the aerosol container is filled so that an internal pressure of the aerosol container in a 25° C. environment is 0.4 to 0.7 MPa,
    onto a contaminant attached to the contaminated part.

5. The method for cleaning a contaminated part according to claim 4, wherein the contaminated part is an automobile part.

6. The method for cleaning a contaminated part according to claim 5, wherein the automobile part is a brake part.

7. The method for cleaning a contaminated part according to claim 4, wherein the contaminant includes an abrasion powder from a brake pad or a brake shoe.

8. The method for cleaning a contaminated part according to claim 4, wherein the content of component (B) contains 1.7 to 8.0 parts by mass with respect to 100 parts by mass of the component (A).

\* \* \* \* \*